US009930673B2

(12) United States Patent
Breuer et al.

(10) Patent No.: US 9,930,673 B2
(45) Date of Patent: Mar. 27, 2018

(54) CONFIGURING AND RECONFIGURING A RADIO LINK IN VIEW OF AN OPERATING TEMPERATURE OF A USER EQUIPMENT WITHOUT CALL INTERRUPTION

(71) Applicant: GEMALTO M2M GMBH, München (DE)

(72) Inventors: Volker Breuer, Bötzow (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 0 days.

(21) Appl. No.: 14/392,190

(22) PCT Filed: Jun. 23, 2014

(86) PCT No.: PCT/EP2014/063114
§ 371 (c)(1),
(2) Date: Dec. 23, 2015

(87) PCT Pub. No.: WO2014/206917
PCT Pub. Date: Dec. 31, 2014

(65) Prior Publication Data
US 2016/0262143 A1    Sep. 8, 2016

(30) Foreign Application Priority Data

Jun. 28, 2013 (EP) .................................. 13174422

(51) Int. Cl.
*H04W 72/00* (2009.01)
*H04W 72/04* (2009.01)
(Continued)

(52) U.S. Cl.
CPC ..... *H04W 72/048* (2013.01); *H04W 52/0258* (2013.01); *H04W 72/042* (2013.01);
(Continued)

(58) Field of Classification Search
CPC ........... H04W 72/048; H04W 72/0413; H04W 72/042; H04W 72/085; H04W 52/0258;
(Continued)

(56) References Cited

U.S. PATENT DOCUMENTS

| 6,690,939 B1* | 2/2004 | Jonsson | ................ H04W 36/18 370/331 |
|---|---|---|---|
| 2004/0160901 A1 | 8/2004 | Raith | |

(Continued)

FOREIGN PATENT DOCUMENTS

WO    WO 00/31990 A2    6/2000

OTHER PUBLICATIONS

International Search Report (PCT/ISA/210) dated Jul. 17, 2014, by the European Patent Office as the International Searching Authority for International Application No. PCT/EP2014/063114.

(Continued)

*Primary Examiner* — Wayne Cai
(74) *Attorney, Agent, or Firm* — Buchanan Ingersoll & Rooney PC (57) ABSTRACT

In an operating method of a user equipment that exchanges signals with network nodes of a cellular radio access network, a quantity that is indicative of a current operating temperature of the user equipment is measured;
the user equipment determines whether a threshold value relating to the operating temperature has been exceeded;
if the threshold value is exceeded, temperature information is transmitted to a network node of the cellular radio access network, to indicate that the threshold value has been exceeded;
in response, the user equipment receives an instruction to use a second set of operating parameters requiring a smaller average power input for the connection to the
(Continued)

cellular radio access network in comparison with the first set of operating parameters; and the user equipment, in response to receiving the instruction, reconfigures its connection to the cellular radio access network so as to use the second set of operating parameters.

18 Claims, 3 Drawing Sheets

(51) Int. Cl.
| | |
|---|---|
| *H04W 52/02* | (2009.01) |
| *H04W 76/04* | (2009.01) |
| *H04W 72/08* | (2009.01) |
| *H04W 76/02* | (2009.01) |
| *H04W 28/18* | (2009.01) |
| *H04W 8/24* | (2009.01) |
| *H04W 36/00* | (2009.01) |

(52) U.S. Cl.
CPC ..... *H04W 72/0413* (2013.01); *H04W 72/085* (2013.01); *H04W 76/028* (2013.01); *H04W 76/04* (2013.01); *H04W 8/24* (2013.01); *H04W 28/18* (2013.01); *H04W 36/0066* (2013.01); *H04W 36/0072* (2013.01); *Y02B 60/50* (2013.01)

(58) Field of Classification Search
CPC ... H04W 76/04; H04W 76/028; H04W 28/18; H04W 8/24; H04W 36/0066; H04W 36/0072; Y02B 60/50
USPC ............ 455/452.1, 452.2, 436; 370/329, 331
See application file for complete search history.

(56) References Cited

U.S. PATENT DOCUMENTS

| | | | |
|---|---|---|---|
| 2008/0046132 | A1 | 2/2008 | Dalsgaard et al. |
| 2010/0273517 | A1* | 10/2010 | Pinheiro ................ H04B 1/036 455/522 |
| 2013/0017851 | A1 | 1/2013 | Kim |
| 2013/0078977 | A1 | 3/2013 | Anderson et al. |

OTHER PUBLICATIONS

Written Opinion (PCT/ISA/237) dated Jul. 17, 2014, by the European Patent Office as the International Searching Authority for International Application No. PCT/EP2014/063114.

Extended European Search Report for 13174422.9 dated Nov. 27, 2013.

* cited by examiner

CONFIGURING AND RECONFIGURING A RADIO LINK IN VIEW OF AN OPERATING TEMPERATURE OF A USER EQUIPMENT WITHOUT CALL INTERRUPTION

The present invention relates to the field of radio resource management in cellular radio access networks. In particular, the invention relates to an operating method of a user equipment that is configured to exchange signals with network nodes of a cellular radio access network, a user equipment that is configured to exchange signals with network nodes of a cellular radio access network, to an operating method of a radio-network-controller node of a cellular radio access network, and to a radio-network-controller node of a cellular radio access network.

Standards of radio communication in cellular radio access networks define one or more temperature ranges, in which user equipment has to reliably fulfil all requirements for standard performance parameters. An example of such requirements is the standard document 3GPP TS 25.101 V11.5.0, published in March 2013. Section D.2.1. defines a temperature range of 15° C. to 35° C. for normal conditions with relative humidity of 25% to 75% for normal conditions and of −10° C. to +55° C. for extreme conditions.

User equipment operated at lower or higher temperatures than those defined by the respective standards cannot be expected to operate reliably in accordance with standard requirements. Failure to do so may result in ineffective usage of radio resources on the network side, and of course in damage to sensitive circuitry of the user equipment, or even in a fire hazard if an overheated user equipment contains or is in thermal contact with inflammable materials.

The document WO2010114939 A1 discloses a user equipment comprising a switching regulator configured to receive an input voltage from a battery and to produce an output voltage dependent on a first signal applied to the regulator control voltage input. A linear regulator coupled to the switching regulator receives the output voltage and produces a time-varying operating voltage. A power amplifier coupled to the linear regulator produces a RF output signal having an RF output power controlled the time-varying operating voltage. A temperature sensing device determines an indication of an operating temperature. An analogue to digital converter receives the input voltage and determines a digital representation of the input voltage. A control module receives the digital representation of the input voltage and the indication of the operating temperature and determines the first signal based on the input voltage, the operating temperature and a set of adjustment values stored in a look up table that stores a set of adjustment values according to the input voltage and the operating temperature. The user equipment is described to allow controlling an operating temperature of the user equipment.

According to a first aspect of the present invention, an operating method of a user equipment that is configured to exchange signals with network nodes of a cellular radio access network is provided. The method comprises:

the user equipment being connected to at least one cellular radio access network via at least one first radio link, using a first set of operating parameters that are associated with the at least one first radio link;

the user equipment performing a measurement of a quantity that is indicative of a current operating temperature of the user equipment or performing a predetermined sequence of at least two such measurements;

the user equipment determining whether or not at least one predetermined upper threshold value of the operating-temperature or of an increase of the operating-temperature or of an increase rate of the measured operating temperature has been reached or exceeded;

if the upper threshold value is determined to be reached or exceeded, the user equipment transmitting a temperature information element to a network node of the cellular radio access network, the temperature information element being indicative of the fact that the respective upper threshold value has been reached or exceeded;

the user equipment receiving, in response to its transmission of the temperature information element, from a radio-network-controller node a control signal indicative of an instruction to the user equipment to reconfigure its connection to the at least one cellular radio access network to use a second set of operating parameters requiring a smaller average power input by the user equipment in using radio resources for the connection to the at least one cellular radio access network in comparison with the first set of operating parameters; and the user equipment, in response to receiving the control signal, reconfiguring its connection to the at least one cellular radio access network so as to use the second set of operating parameters instead of the first set of operating parameters.

The method of the first aspect of the present invention achieves an operation of a user equipment that helps handling extreme temperature conditions of the user equipment without having to interrupt an ongoing connection of the user equipment with a network. As such, it provides an improvement over brute-force type solutions, which involve shutting down the user equipment. In comparison with the prior art of WO2010114939 A1, the operating method improves the stability of an active network connection and allows maintaining for instance a given PPP connection or context, e.g., a PDP context, and quality of service despite extreme temperature conditions. For the user equipment triggers an adaptation of the existing radio link that allows the user equipment switching from a first set of operation parameters to a second set of operation parameters, which contributes to relaxing the current extreme temperature conditions of the user equipment.

The operating temperature of the user equipment is in preferred embodiments a temperature of electronic components such as processors or other circuitry at the time of measurement of the temperature, irrespective of an operational state of the user equipment at the time of measurement.

The method determines in one of its steps whether or not at least one predetermined upper threshold value of the operating-temperature or of an increase of the operating-temperature or of an increase rate of the measured operating temperature has been reached or exceeded. For instance, the measured operating temperature may be determined to be equal or higher than an upper operating-temperature threshold value. This is to be understood as including in different embodiments the cases of the operating temperature either being equal, or being higher, or being any of equal or higher without determination which of the two applies. An example of the latter case is a determination that the operating temperature is not lower than the upper-operating-temperature threshold value.

In other embodiments, the threshold value relates to an increase of the operating temperature between different measurements of a predetermined sequence of measurements of the operating temperature. In one such embodiment, the operating temperature is measured repeatedly, each measurement being performed after a predetermined time interval has elapsed since the last measurement. In one variant of such embodiments, the definition of the time interval includes a dependency on the operating temperature value last determined. This allows an adaptation of the monitoring frequency to a current risk of overheating. For instance, by providing a higher rate of measurements from a certain higher operating temperature on, i.e., in case of a detected higher risk of overheating, an increased frequency of monitoring of the operating temperature ensures the possibility of timely response measures as soon as they are needed in order to avoid actual overheating. The difference of the operating temperature between different measurements may thus relate in different embodiments to measurements performed at equal distances in time or to measurements performed at different distances in time.

In other embodiments, the threshold value relates to an increase rate of the measured operating temperature. This corresponds to monitoring a rate of change of the temperature, thus, an increase velocity or, in mathematical terms, to a first derivate of the operating temperature as a function of time. In a further embodiment, the threshold value relates to a second derivative of the operating temperature as a function of time.

In further embodiments at least two temperature-related quantities are tested by the user equipment against respective threshold values. For instance, in one such embodiment, a current increase rate of the operating temperature is determined in addition to the current operating temperature itself. This allows a more precise risk assessment, because for a given operating temperature a higher increase rate is indicative of a higher risk of overheating than a lower increase rate of the operating temperature. The second derivative may be determined in addition, in order to obtain information on a current trend in the rate of change of the operating temperature.

According to the method of the first aspect of the present invention, the user equipment receives, in response to its prior transmission of the temperature information element, a control signal from a radio-network-controller node. The control signal instructs the user equipment to change from a first set of operating parameters to a second set of operating parameters. By adapting the operating parameters it is thus possible to avoid that limit values imposed by an initially assigned QoS class are exceeded, which in absence of the adaptation would lead to timeouts or even a breakdown of an existing connection. The first and second sets of operating parameters correspond to respective radio-access-bearer allocations to the user equipment. In a first variant of the method of the first aspect of the invention, the first and second set of operating parameters are used in the context of an allocation to the same radio access bearer. In a second variant of the method of the first aspect of the invention, the first and second set of operating parameters are used in the context of an allocation to different radio access bearers, which are referred to as first and second radio access bearers.

In one embodiment, only one operating parameter is reconfigured. In another embodiment two or more operating parameters are reconfigured. The first and second set of operating parameters need not be identical in their respective quantities they define, that is, the second set of operating parameters may relate to different quantities than the first set of operating parameters. The second set of operating parameters to be used after the change may vary in dependence on the circumstances. It is not to be understood as a certain fixed set of parameters that applies to all circumstances.

Both the first and the second set of operating parameters may include any number of operating parameters. Embodiments of the present invention make use of a change (first and second variant, as applicable) of one or more of the following operating parameters, without restriction: a transmission power, a data throughput such as a guaranteed bit rate, a technology (LTE, 3G, 2G), a modulation scheme (such as 64 QAM, 32 QAM, 16 QAM, 8-PSK, GMSK for a 2G technology), a coding scheme, a number of antennas used for transmission or reception, used bandwidth and used frequency band, a traffic class (conversational, streaming, interactive, background), individual QoS parameters of a currently assigned QoS class (e.g., a maximum bit rate, a maximum allowable error rate or error ratio), a traffic handling priority, a maximum transfer delay, a delay variation requirement.

The reconfiguration of the radio link can be implemented in different ways. In one embodiment, the received control signal is additionally indicative of an instruction to reconfigure the first set of operating parameters so as to form a second set of operating parameters under continued assignment to the at least one first radio link. The user equipment, in response to receiving the control signal, maintains the first radio link and performs a parameter reconfiguration procedure of the at least one first radio link so as to use the second set of operating parameters. In a variant of this embodiment, the control signal is additionally indicative of an instruction to suspend the connection to the at least one radio access network via the first radio link for a determined time span, and to resume the connection after the determined time span has elapsed. The user equipment, in response to receiving the control signal, suspends but maintains the connection to the at least one radio access network via the first radio link for the determined time span, and resumes the connection after the determined time span has elapsed. The time span is in one embodiment that follows a UMTS standard determined in accordance with the provisions of TS 25.215, using a certain system frame number (SFN), a certain connection frame number (CFN) or a difference between the SFN and the CFN. Other mathematical combinations of the SFN and the CFN are used in variants of this embodiment.

In embodiments forming an alternative to maintaining the first radio link, the received control signal is additionally indicative of an instruction to operate under an assignment to at least one second radio link, which is different from the first radio link. In such embodiments, the user equipment, in response to receiving the control signal, performs a radio-link reconfiguration procedure to change from the at least one first radio link to the at least one second radio link so as to use the second set of operating parameters.

An example of such a radio-link reconfiguration procedure is an InterRAT handover process, which modifies the radio link while maintaining the connection. This allows changing using a technology on the side of the user equipment that requires less transmission power due to a modified parameter set. An InterRAT handover to a technology which requires lower power input would for instance help mitigating temperature related situations at the user equipment.

One embodiment of the method of the first aspect of the present invention provides that the user equipment interrupts using the radio resources allocated to the first radio link after determining that the measured operating temperature is equal or higher than the upper operating-temperature threshold value, until the control signal has been received. However, the established connection with the network is maintained. This embodiment provides additional protection of the user equipment against possible damage resulting from an extreme operating temperature while avoiding a breakdown of the existing connection.

The first radio link that in the mentioned different embodiments is subject to a parameter reconfiguration procedure or a radio link reconfiguration procedure is in different embodiments a radio access bearer, a dedicated radio channel, or a shared radio channel.

In further embodiments, the user equipment interrupts using the radio resources allocated to the at least one first radio link for sending payload data in an uplink direction but keeps using the radio resources allocated to the at least one first radio link for receiving control information in a download direction, after determining that the measured operating temperature is equal or higher than the upper operating-temperature threshold value, until the control signal has been received. In particular only the uplink, in particular only the payload in uplink connection are interrupted, that is at least that signalling that is required both in up- and downlink for maintaining the connection can be continued.

In other embodiments, the user equipment is configured to take additional measures against an overheating that are provided for the case that the operating temperature increase continues despite measures taken in accordance with the method of the present invention. In particular, the user equipment is configured to perform further interruption measures in the event of detecting an operating temperature or operating-temperature change of increasing escalation severity. Response measures listed in order of increasing severity are in one such embodiment:
a) uplink transmission of user payload data is interrupted;
b) uplink ACK/NACK signalling for downlink traffic is interrupted;
c) Downlink payload data is no longer decoded; and
d) Finally: The signalling link is terminated.

It is further advantageous that the user equipment is configured to operate a timer in the process of waiting for a response from a network node of the cellular radio access network. In one implementation that uses such a timer, the user equipment is configured to employ a predefined retry mechanism when a preset time span has elapsed after sending the temperature information element to the network node. In another implementation, the user equipment begins with an interrupted service or resumes a suspended connection again should the radio network controller not answer within a preset time span and in case the operating temperature has been detected to have meanwhile decreased below the set upper threshold value.

As an extension of the method of the first aspect, a further embodiment additionally comprises, before operating under an assignment to at least one first radio link, that the user equipment transmits a request signal for an initial allocation of radio resources to trigger an allocation of the at least one first radio link to the user equipment, the request signal including a second temperature information element indicative of a predetermined temperature capability information allocated to the user equipment.

User equipment devices have different capabilities with respect to their temperature behaviour. Some devices are very sensitive to extreme temperatures, others are rather insensitive. Some allow a longer time span of operation under extreme temperatures, others allow a shorter time span. The present embodiment provides that the user equipment transmits a request signal for an initial allocation of radio resources to trigger an allocation of the at least one first radio link to the user equipment. The request signal includes in this embodiment a second temperature information element that is indicative of a predetermined temperature capability information allocated to the user equipment.

This embodiment extends the smart type of protection of the user equipment according to the present invention to the initial setup of the first radio link and thus allows achieving an initial radio link configuration that takes the capability of the user equipment with respect to its operating temperature into account. The transmission of the temperature capability information provided according to the present embodiment enables the radio-network-controller node, which processes the initial request by the user equipment, to select a radio link for the requested radio resources that fits to the temperature capability of the user equipment and is thus likely to avoid that an extreme operating temperature of the user equipment occurs.

The temperature capability information is in one implementation of this embodiment allocated to the user equipment by means of an allocation of the user equipment to a respective class of a predetermined classification that specifies the temperature capability in different classes. The present embodiment may thus be implemented by using a predefined classification of user equipment devices according to different temperature capability classes. Currently, such classification does not exist. The classes are preferably distinguished from each other by at least one of the following parameters: an upper operating-temperature threshold value, a maximum allowable gradient of the operating temperature over a predefined time span, a maximum allowable operating-temperature load over a predefined time span, a maximum allowable level of power output by the user equipment in using radio resources, or one of a set of allowable maximum time spans for respective given power output levels. A temperature load is a quantity that is determined by determining an integral of the operating temperature over time within a defined time span. Of course, known approximations for the determination of the time integral of the operating temperature may be used. Different allowable maximum levels of power output by the user equipment in using radio resources or different allowable maximum time spans for respective given power input levels determine respective power input levels on the side of the user equipment, which directly influence its operating temperature.

The second temperature information element as such, that is, as a data structure, may in some embodiments be identical to the temperature information element mentioned earlier. In other words, information on the current operating temperature and on the temperature capability of the user equipment may be comprised by the same message, depending on the circumstances. To this end, in one implementation of the present embodiment, the user equipment performs the measurement or the sequence of measurements of the quantity that is indicative of the current operating temperature of the user equipment also before transmitting the request signal for the initial allocation of radio resources. That means, the classification provides information that can be used by the network when determining the most suitable first radio link, but also at later instances when the radio link has to be changed.

Each of the mentioned temperature information element and second temperature information element in other embodiments either forms a message or is included in a respective context-specific message generated by the user equipment and transmitted to its assigned radio-network-controller node. The message is preferably in accordance with a predetermined protocol, such as a Radio Resource Control (RRC) protocol in the exemplary case that a 3G technology is used. For instance, the temperature information element may be an implementation of a "cause" information element that is associated with certain RRC protocol requests. Temperature capability information is in one embodiment included in a data field including information indicating features supported by the user equipment. Such data fields are known per se in standard protocols, but the inclusion of the temperature capability information forms a new extension to the protocol. In another embodiment, the temperature capability information is included in a second data field separate from the mentioned known data field. The temperature capability information is preferably signaled to the network at the time of registration of the user equipment with the network.

For clarity it is noted that to the best of the inventors' knowledge communication protocols known to date in the field of cellular wireless communication technology do not require nor disclose a transmission neither of the temperature information element nor the second temperature information element from the user equipment to a radio-network-controller node of the radio access network in a message, be it alone or in combination with other payload or control information. Embodiments of the present invention thus are able to enhance an exchange according to standard protocols by novel signalling features that allow an improved management of the operating temperature of the user equipment, which avoids call interruptions or even damage to the user equipment.

Typically, a user equipment is to be assigned to a respective temperature capability class by its manufacturer, typically in accordance with standardized test procedures for determining the temperature capability class of a user equipment. Further theses parameters assigned to the singular temperature classes can be differentiated by service types. That means, depending upon the requested service type for the configuration message different parameters within the same temperature class are considered. As such service types it can be distinguished voice calls, bulk data upload or download, streaming, single messages like SMS or MMS etc., video telephony, gaming etc as defined in TS 23.107 and TS 25.993.

In a further embodiment, the user equipment, before determining whether the upper threshold value is reached or exceeded, selects, in dependence on a service type currently used or requested by the user equipment on the radio link, the upper threshold value from a stored set of upper threshold values as the applicable upper threshold value.

According to a second aspect of the present invention, a user equipment is provided that is configured to exchange signals with network nodes of a cellular radio access network. The user equipment comprises
  a communication unit, which is configured to establish, maintain and use radio resources of a connection to a least one cellular radio access network via at least one first radio link, using a first set of operating parameters that are associated with the at least one first radio link;
  a measurement unit which is configured to perform a measurement of a quantity that is indicative of a current operating temperature of the user equipment or to perform a predetermined sequence of at least two such measurements; and
  an evaluation unit which is connected with the measurement unit and the communication unit and which is configured to determine whether or not at least one predetermined upper threshold value of the operating-temperature or of an increase of the operating-temperature or of an increase rate of the measured operating temperature has been reached or exceeded.

The communication unit of the user equipment is further configured
  to transmit, if the upper threshold value is determined to be reached or exceeded, a temperature information element to a network node of the cellular radio access network, the temperature information element being indicative of the fact that the respective upper threshold value has been reached or exceeded;
  to receive, in response to its prior transmission of the temperature information element, from a radio-network-controller node a control signal indicative of an instruction to the user equipment to reconfigure its connection to the at least one cellular radio access network to use a second set of operating parameters requiring a smaller average power input by the user equipment in using radio resources for the connection to the at least one cellular radio access network in comparison with the first set of operating parameters, and in response to receiving the control signal, to reconfigure its connection to the at least one cellular radio access network so as to use the second set of operating parameters instead of the first set of operating parameters.

The user equipment of the second aspect of the present invention allows performing the operating method according to the first aspect of the invention and therefore shares its advantages.

Embodiments of the user equipment implement the functionality described in the context of the operating method of the first aspect of the invention. Further embodiments of the user equipment will be described in the following.

The user equipment may be any device configured to exchange signals with network nodes of a cellular radio access network. In different embodiments, the user equipment is a mobile phone, a smart phone, a personal digital assistant, a wireless module for machine-to-machine-communication, a computer, notebook or laptop comprising a radio communication unit for exchange of signals with network nodes of a cellular radio access network, etc.

The measurement unit is not limited to a specific technique of measuring the operating temperature of the user equipment. A quantity indicative of the operating temperature of the user equipment is for instance a temperature of a main circuit board that carries at least one processor, chipset or application-specific circuitry required for operation of the user equipment in exchanging signals with network nodes of a cellular radio access network. There are various physical quantities that can be detected by a temperature sensor comprised by the measurement unit in different embodiments. For instance the measurement unit can be configured to measure a temperature-dependent Ohmic resistance of a resistor arranged in the user equipment, a DC temperature-dependent current amplitude in a certain circuit, a temperature-dependent frequency of an AC current or voltage in a circuit, a temperature-dependent capacitance or inductance, infrared radiation etc.

In some embodiments, the communication unit is configured to determine that the received control signal is additionally indicative of an instruction to reconfigure the first set of operating parameters so as to form a second set of operating parameters under continued assignment to the at least one first radio link, and, in response to determining this, to maintain the first radio link and to perform a parameter reconfiguration procedure of the at least one first radio link so as to use the second set of operating parameters. In addition or as an alternative to this, the communication unit is in some embodiments configured to determine that the received control signal is additionally indicative of an instruction to operate under an assignment to at least one second radio link, which is different from the first radio link, and in response to determining this, to perform a radio-link reconfiguration procedure to change from the at least one first radio link to the at least one second radio link so as to use the second set of operating parameters.

In another embodiment, the communication unit is additionally configured to determine that the control signal is additionally indicative of an instruction to suspend the connection to the at least one radio access network via the first radio link for a determined time span, and to resume the connection after the determined time span has elapsed, and, in response to determining this, to suspend the connection to the at least one radio access network via the first radio link for the determined time span, and to resume the connection after the determined time span has elapsed.

In some embodiments, the communication unit is configured to interrupt using the radio resources allocated to the first radio access bearer. In particular, the communication unit is in such embodiments configured to interrupt, in response to determining that the upper threshold value has been reached or exceeded and until the control signal has been received, using the radio resources allocated to the at least one first radio link for sending payload data in an uplink direction, and to keep using the radio resources allocated to the at least one first radio link for receiving control information in a download direction. In some embodiments, this way of operation is used at least until the control signal has been received.

In another embodiment, the communication unit is additionally configured to transmit a request signal for an initial allocation of radio resources to trigger an allocation of the at least one first radio link to the user equipment, the request signal including a second temperature information element indicative of a predetermined temperature capability information allocated to the user equipment. In a preferred implementation of this embodiment, the second temperature information element determines the temperature capability information allocated to the user equipment by means of an allocation of the user equipment to a respective class of a predetermined classification that specifies in different classes, which are distinguished from each other by at least one of the following: an upper operating-temperature threshold value, a maximum allowable gradient of the operating temperature over a predefined time span, a maximum allowable operating-temperature load over a predefined time span, a maximum allowable level of power output by the user equipment in using radio resources, or one of a set of different allowable maximum time spans for respective given power output levels.

Preferably, the evaluation unit is configured to select, before determining whether the upper threshold value is reached or exceeded, in dependence on a service type currently used or requested by the user equipment on the radio link, the upper threshold value from a stored set of upper threshold values as the applicable upper threshold value.

In a further embodiment, the communication unit is configured to generate and transmit, in response to the evaluation unit determining that the upper threshold value has been reached or exceeded, either a reconfiguration-request message or a cell-reselection-request message, each including the temperature information element as a part of the respective message. In a 3G (UMTS) technology, such requests are defined as a part of the Radio Resource Control (RRC) protocol, and the temperature information element can be included as a "Cause" information element according to the RRC protocol. Another option is using control information on level 1 according to the OSI model.

A third aspect of the present invention is formed by an operating method of a radio-network-controller node of a cellular radio access network. The method comprises:

the radio-network-controller node serving a user equipment in a connection to the cellular radio access network via at least one first radio link and requiring the user equipment to use a first set of operating parameters that are associated with the at least one first radio link;

the radio-network-controller node receiving a temperature information element from the user equipment, the temperature information element being indicative of the fact that at least one predetermined upper threshold value of an operating-temperature or of an increase of the operating-temperature or of an increase rate of the operating temperature of the user equipment has been reached or exceeded;

in response to receiving the temperature information element, the radio-network-controller node sending to the user equipment a control signal indicative of an instruction to the user equipment to reconfigure its connection to the at least one cellular radio access network so as to use a second set of operating parameters requiring a smaller average power input by the user equipment in using radio resources for the connection to the at least one cellular radio access network in comparison with the first set of operating parameters.

The operating method forms an aspect of the invention that is complementary to the operating method of the first aspect of the invention. The mutual signalling communication of the user equipment and the radio-network-controller node according to the present invention, and the further signalling activities of the radio-network-controller node in exchange with other network nodes (specific further network nodes involved depend on the specific embodiment) allows achieving a radio link adaptation when an extreme-temperature condition is detected by the user equipment.

The method of the third aspect provides a possibility for a radio-network-controller node to support avoiding or amending extreme-temperature conditions detected by a user equipment that is assigned to the radio-network-controller node, without having to interrupt an ongoing connection of the user equipment with the network.

Embodiments of the method of the third aspect of the invention will be described in the following.

In one embodiment, the control signal comprises an instruction to the user equipment to reconfigure the first set of operating parameters so as to form a second set of operating parameters under continued assignment to the at least one first radio link, and wherein the radio-network-controller node, in response to sending the control signal, maintains the first radio link and performs a parameter reconfiguration procedure of the at least one first radio link so as to require the user equipment to use the second set of operating parameters.

In another embodiment, the control signal comprises an instruction to the user equipment to operate under an assignment to at least one second radio link, which is different from the first radio link, and wherein the radio-network-controller node, in response to sending the control signal, performs a radio-link reconfiguration procedure to change from the at least one first radio link to the at least one second radio link so as to require the user equipment to use the second set of operating parameters.

One embodiment comprises, before establishing the radio resources:

the radio-network-controller node receiving a request for an initial allocation of radio resources from the user equipment, the request comprising a second temperature information element, the second temperature information element being indicative of a temperature capability information allocated to the user equipment;

the radio-network-controller node determining and selecting the first set of operating parameters as being suitable for a radio link to be allocated to the user equipment in dependence on the second temperature information element;

performing a predetermined signalling sequence for setting up the determined first radio link and allocating it to the user equipment.

This embodiment achieves an initial allocation of a radio link to the user equipment that suits the temperature capability of the user equipment so as to help avoiding extreme temperature conditions caused by operation of the user equipment under assignment to the allocated radio link.

Implementations of this embodiment involving the use of a classification of user equipment devices according to their respective temperature capabilities by the radio-network-controller node have been presented above in the context of other aspects of the present invention and apply in the present context as well. The radio-network controller, when determining a suitable first radio link preferably accesses a data base allocating a respective temperature capability class to at least one suitable first radio link. The allocation in the data base is in one implementation of this embodiment further differentiated by the value of the current operating temperature. That means, a user equipment may be allocated to different radio links according to its temperature capability class, the most suitable radio link being determined and selected by the radio-network-controller node in accordance with a current operating temperature of the user equipment. In other embodiments, the determination and selection of the first or the second radio link is alternatively or additionally differentiated by the radio-network-controller node in accordance with a service type requested by the user equipment.

In such embodiments, in which an initial allocation of radio resources to the requesting user equipment is to be made, the request for allocation of radio resources from the user equipment additionally comprises service-type information indicative of a service type requested by the user equipment. In response, the radio-network-controller node selects the first set of operating parameters in dependence on the service-type information.

Preferably, the radio-network-controller node, before sending to the user equipment the control signal indicative of the instruction to set up the first radio link or to reconfigure the connection so as to use the second set of operating parameters, selects the first set of operating parameters or the second set of operating parameters in additional dependence on the temperature capability information allocated to the user equipment or on the service-type information received from the user equipment, or on both.

Thus, different implementations provide that the selection of the first radio link or the reconfiguration of the first radio link, or the selection of the second radio link and of its respective allocated set of operating parameters is performed by the radio-network-controller node in dependence on the current operating temperature of the user equipment, or on the temperature capability of the user equipment, and in additional dependence on the requested service type.

Thus, the temperature-oriented radio-link management by the radio-network-controller node in dependence on service-type is in some embodiments not only performed at the initial setup of the first radio link. It may also be performed in the context of the instruction to the user equipment in response to a transmission of the first temperature information element. To this end, the radio-network-controller node determines and selects the second set of operating parameters requiring a smaller average power input by the user equipment in using radio resources for the connection to the at least one cellular radio access network in comparison with the first set of operating parameters, in accordance with the service-type requested by the user equipment.

The determination and selection is in some embodiments performed by the radio-network-controller node in a signalling exchange with at least one further network node of the radio access network, or with a core-network node.

In one embodiment, the instruction to reconfigure the first set of operating parameters includes an instruction to change from a currently active first quality-of-service class to a second quality-of-service class that is lower than the first. This embodiment allows the user equipment a reduction of is power input by fulfilling more relaxed QoS requirements.

In another embodiment, the at least one second radio link requires the user equipment to employ a transmission power that is reduced in comparison with the first radio link.

A fourth aspect of the present invention is formed by a radio-network-controller node of a cellular radio access network. The radio-network-controller node comprises a resource-control unit configured to establish and maintain radio resources allocated to at least one first radio link allocated to a user equipment; wherein the resource-control unit is further configured to receive a temperature information element from the user equipment, the temperature information element being indicative of the fact that indicative of the fact that at least one predetermined upper threshold value of an operating temperature of the user equipment or of an increase of the operating-temperature or of an increase rate of the operating temperature has been reached or exceeded;

in response to receiving the temperature information element, to sending to the user equipment a control signal indicative of an instruction to the user equipment to reconfigure its connection to the at least one cellular radio access network so as to use a second set of operating parameters requiring a smaller average power input by the user equipment in using radio resources for the connection to the at least one cellular radio access network in comparison with the first set of operating parameters.

The radio-network-controller node of the fourth aspect of the invention shares the advantages of the method of the third aspect of the invention.

Embodiments of the radio-network-controller node implement the functionality described in the context of the operating method of the third aspect of the invention.

Further embodiments of the radio-network-controller node will be described in the following.

The radio-network-controller node is configured to serve the user equipment on the side of the radio access network. The term radio-network-controller node is not used to imply any restrictions as to a physical or logical network node that has to form the radio-network-controller node of the present invention. Furthermore, there is no implied restriction to a particular standard of cellular radio communication. Therefore, the radio-network-controller node may be called with the same meaning a radio network node that is configured to control a radio link.

The radio-network-controller node is in different embodiments configured for operation in a 2G, 3G or 4G radio access network. In a 2G network, embodiments of the radio-network controller additionally perform functionality of a 2G Base station controller (BSC). In a 3G network, embodiments of the radio-network-controller node additionally perform functionality of a 3G radio network controller (RNC), and in communication with the user equipment may in particular additionally perform functionality of a serving RNC. In a HSPA network, embodiments of the radio-network-controller node additionally perform functionality of a RNC and are typically integrated into a NodeB. In a 4G network, embodiments of the radio-network-controller node additionally perform functionality of an eNodeB.

Preferably, the resource-control unit is further configured to
  receive a request for allocation of radio resources from the user equipment, the request comprising a second temperature information element, the second temperature information element being indicative of a temperature capability information allocated to the user equipment;
    to determine a set of operating parameters as the first set of operating parameters for being suitable for a radio link to be allocated to the user equipment in dependence on the second temperature information element; and
    to perform a predetermined signalling sequence for setting up the determined first radio link and allocating it to the user equipment.

Further embodiments will be described in the following with reference to the Figures.

Figure 1:
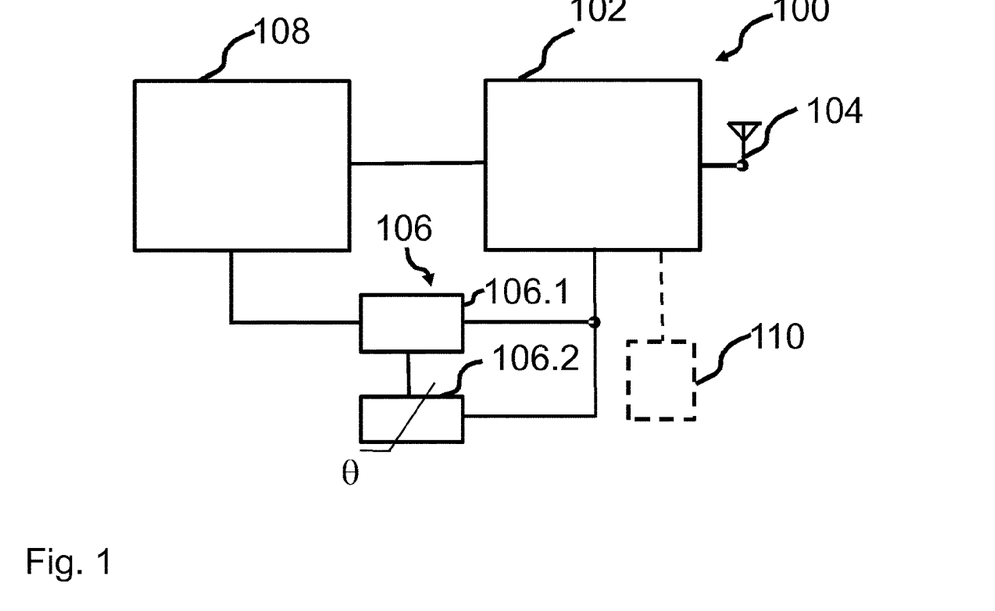
FIG. 1 shows a schematic block diagram of an embodiment of a user equipment.

FIG. 1 shows a schematic block diagram of an embodiment of a user equipment 100. The user equipment 100 is a device capable of wireless communication via a radio communication channel provided by a cellular radio access network. The cellular radio access network may require a signalling for setting up, maintaining, modifying, and closing a communication channel in accordance with a predefined protocol. Accordingly, the user equipment 100 is configured to communicate with network nodes of at least one radio access network in accordance with at least one of these protocols. Examples are protocols of a 2G, 3G or a 4G (LTE) protocol. In some embodiments, the user equipment 100 is capable of communication using two or more of these technologies, depending on user selection or network coverage. The communication functionality of the user equipment 100 is implemented in a communication unit 102, which is connected with at least one antenna, one of which is shown under the reference label 104 in FIG. 1. The communication unit 102 is configured to establish, maintain and use radio resources of a connection to at least one cellular radio access network via at least one radio link, using a set of operating parameters associated with this radio link. A radio link established upon initial registration of the user equipment with a cellular radio access network is in other parts of the description and in the claim also referred to as a "first radio link". The communication unit thus performs all functions of a radio communication device, be it in the baseband or in higher-frequency bands.

The communication unit is connected with a measurement unit 106, which is configured to perform a measurement of a quantity that is indicative of a current operating temperature of the user equipment 100. In the present embodiment, the measurement unit 106 has a measurement control unit 106.1 and a temperature sensor 106.2. The temperature sensor 106.2 is a temperature-sensitive resistor, such as a NTC resistor or a PTC resistor. The temperature sensor 106.2 is connected to a circuit board (not shown) which also comprises the communication unit 102 or at least parts of the communication unit 102. It is noted that this arrangement of the measurement unit 106 is an example. Other implementations of a temperature sensor are possible.

The measurement control unit 106.1 is configured to determine a current resistance of the temperature sensor 106.2 and determine a temperature from the measured resistance value. This determined temperature is provided at its output to the evaluation unit 108. The evaluation unit 108 is configured to determine whether or not the measured temperature value reaches or exceeds a predetermined upper threshold value of the temperature, which herein is also referred to as the operating temperature. To this end, the evaluation unit comprises or has access to a memory that stores the upper threshold value of the operating temperature. The evaluation unit further has a comparator, which compares the measured temperature value with the stored upper threshold value. In case the upper threshold value has been reached or exceeded, the evaluation unit 108 provides a corresponding output signal to the communication unit indicative of this assessment. Upon receiving this signal from the evaluation unit, the communication unit generates and transmits a temperature information element via the antenna 104. The temperature information element is transmitted to a network node of the cellular radio access network and indicates the fact that the upper threshold value has been reached or exceeded.

In a variant, the measurement unit 106 performs a sequence of at least two temperature measurements. The evaluation unit 108 determines whether an upper threshold value of an increase of the operating temperature has been reached or exceeded. In another variant, a sequence of three or more measurements is made and continuous evaluations of the increase of the operating temperature are performed, in order to determine a rate of the increase of the measured operating temperature. Again, the evaluation unit 108 is configured to compare this increase rate of the operating temperature with a predetermined upper threshold value and provides a signal at its output if the upper threshold value has been reached or exceeded. In another embodiment, a combination of at least two of these variants is used. The evaluation unit 108 thus compares two different quantities with respective threshold values. A criterion for providing an output signal to the communication unit indicative of an access temperature or temperature increase may be set in accordance with the particulars of a given user equipment. In another variant, the measurement unit performs a sequence of temperature measurements and calculates a temperature load by calculating a quantity that corresponds to an integral of the measured temperature over time between a determined starting point and a determined point of the temperature measurement. This way, a temperature load is determined. The evaluation unit compares the determined temperature load with an upper threshold value of the temperature load stored in a memory. A variant of the user equipment 100 has a memory 110, which is connected with the communication unit 102 and which stores a temperature-capability information element that is associated with the user equipment 100. The temperature-capability information element is a characteristic of the user equipment device. It is initially identical for devices of the same model by a given manufacture. The temperature-capability information element provides information on the capability of the user equipment regarding operation under extreme temperatures. Extreme temperatures are well defined according to the known telecommunication standards. Based on this definition, the temperature capability information element specifies a sensitivity of the user equipment device 100 to search extreme temperatures. In this regard, sensitivity means a threshold of a quantity indicative of a temperature stress, to which the user equipment 100 is subjected and from which on negative effects on the performance of the user equipment must be expected. The temperature-capability information element is for instance defined by means of a classification of user equipment devices into different temperature capability classes, according to predefined criteria.

Operation of the user equipment device 100 will be described further below in the context of the description of FIGS. 3 and 4.

Figure 2:
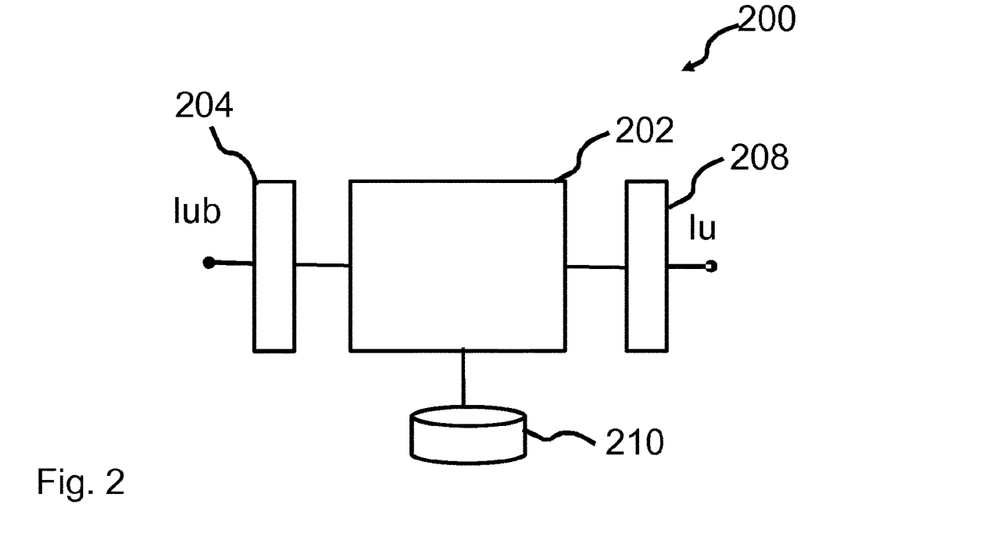
FIG. 2 shows a schematic block diagram of a radio-network-controller node.

FIG. 2 shows a schematic block diagram of a radio-network-controller node 200. The radio-network-controller node 200 of the present embodiment is configured for use in accordance with a UMTS (3G) standard. However, the reference to a 3G standard is intended as an example only and does not imply any restriction in the scope of applicability of the invention. Only modifications known to a person of ordinary skill in the art and outside the scope of the present invention are required to adapt the structure of the radio-network-controller node shown in the block diagram of FIG. 2 to form a radio-network-controller node that is designed for use in a 2G or 4G cellular radio access network.

The radio-network-controller node 200 has a resource-control unit 202, which is connected with interface units 204 and 206. An Iub interface unit 204 connects the radio-network-controller node to one or more nodeB (not shown) that provide radio access to user equipment devices. An Iu interface unit 208 connects the radio-network-controller node 200 to a core-network node (not shown). Other interface units may be present, such as an Iur interface unit (not shown) for connection to another radio-network-controller node, for instance for handover operations.

Generally speaking, the resource-control unit of any radio-network-controller node according to the present invention is configured to operate as a state machine in determining a transition from a given current state of operation of a user equipment, involving a first set of operating parameters that are associated with an existing first radio link, to a respective target state of operation of the user equipment. The target state involves using a second set of operating parameters and requires a smaller average power input by the user equipment than the current state in using the radio resources associated with the existing connection of the user equipment to the radio access network. The determination of the target state is performed by the resource-control unit upon request by the user equipment. The request informs the radio-network-controller node about an extreme-temperature condition on the side of the user equipment. The determination is performed by the resource-control unit using one or more input parameters. Input parameters influencing the target state comprise at least one of the following: a service type requested by the user equipment, a temperature-capability information allocated to the user equipment, and a current operating temperature of the user equipment. The target state is selected such that a loss of the existing connection of the user equipment to the radio access network can be avoided. Optionally, the resource-control unit additionally also determines the first radio link based on input parameters comprising at least one of the service type requested by the user equipment, the temperature-capability information allocated to the user equipment, and the current operating temperature of the user equipment.

In the implementation shown in FIG. 2, the radio-network-controller node 200 comprises a data base 210. The data base provides predefined allocations of radio-link configurations to alternative radio-link configurations requiring a smaller average power input by the user equipment in the sense just described.

Figure 3:
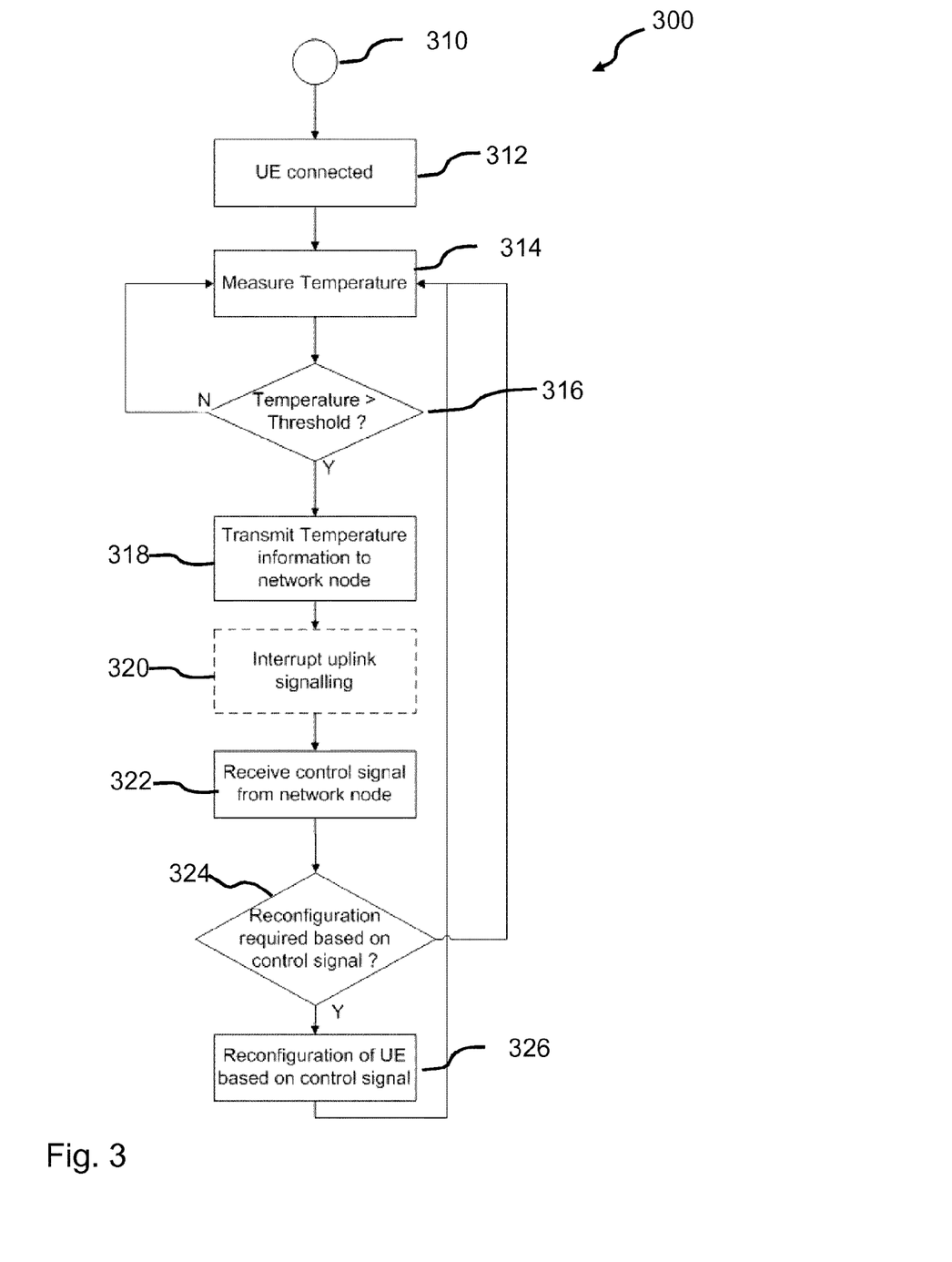
FIG. 3 shows a flow diagram of an embodiment of a method for operating a user equipment.

FIG. 3 shows a flow diagram of an embodiment of a method 300 for operating a user equipment. In particular, the method 300 may be performed by the user equipment 100 of FIG. 1.

The method is started in a step 310. Accordingly, in a step 312 the user equipment 100 is connected to a radio access network via a first radio link associated with a first set of operating parameters on the side of the user equipment. Subsequently, the user equipment may communicate signalling data or payload data via the radio access network according to a requested service and using the first radio link. In a step 314, the user equipment determines an operating temperature of the user equipment. In step 316, it is determined whether or not the measured operating temperature has exceeded a predetermined upper threshold value. If this is not the case, the user equipment continues operation using the first radio link for exchange of signalling and payload data, and periodically repeats the temperature measurement of step 314. If the measured operating temperature is found to exceed the set upper threshold value, the user equipment sends the temperature information to a radio-network-controller node of the radio access network in step 318. The temperature information is for instance directed to a radio-network-controller node, such as the node 200 shown in FIG. 2. This will be explained in more detail in the context of FIG. 4. Optionally, the user equipment interrupts any uplink signalling (step 320) until a control signal is received from the network node in step 322. In step 324, the user equipment determines whether the control signal is indicative of an instruction to the user equipment to reconfigure its connection to the cellular radio access network and use a second set of operating parameters requiring a smaller average power input by the user equipment in using radio resources for the connection to the cellular radio access network in comparison with the first set of operating parameters. If this is not the case, the user equipment branches back to step 314 to determine whether the measured extreme-temperature condition is still present. If, on the other hand, the control signal does instruct the user equipment to reconfigure its connection, this step is performed in accordance with the instructions in step 326.

There are different possibilities for reconfiguration of the connection. The control signal may be an instruction to reconfigure the first set of operating parameters so as to form a second set of operating parameters under continued assignment to the first radio link. In this case, the user equipment, in response to receiving the control signal, maintains the first radio link and performs a parameter reconfiguration procedure of the at least one first radio link so as to use the second set of operating parameters. In this case, the control signal may, in a 3G example, originate from a Serving RNC as the associated radio-network-controller node and trigger a radio link reconfiguration procedure involving a signalling exchange on a dedicated control channel (DCCH) to reconfigure a radio bearer reconfiguration of the first radio link. The reconfiguration may for instance follow a process outlined in 3GPP TR 25.931, V11.0.0 (2012-09), page 45, FIG. 7.8.1.2. This process achieves a reconfiguration in the form of a radio access bearer modification and a synchronised download channel modification that goes along with bandwidth decrease in order to achieve a decrease in average input power. The reconfiguration may alternatively follow a process outlined in 3GPP TR 25.931, V11.0.0 (2012-09), page 92, FIG. 7.14.1.3. This process that is useful while using an ALCAP (Q.2630.2) mechanism achieves a reconfiguration in the form of a synchronized transport channel reconfiguration that goes along with bandwidth decrease in order to achieve a decrease in average input power. The reconfiguration may alternatively follow a process outlined in 3GPP TR 25.931, V11.0.0 (2012-09), page 92, FIG. 7.14.2.3. This process that is useful while using an ALCAP (Q.2630.2) mechanism achieves a reconfiguration in the form of an unsynchronized transport channel reconfiguration that goes along with bandwidth decrease in order to achieve a decrease in average input power.

On the other hand, the control signal may be an instruction to operate under an assignment to at least one second radio link, which is different from the first radio link. In this case, the user equipment, in response to receiving the control signal, performs a radio-link reconfiguration procedure to change from the at least one first radio link to the at least one second radio link so as to use the second set of operating parameters. The reconfiguration may for instance follow a process outlined in 3GPP TR 25.931, V11.0.0 (2012-09), FIG. 7.13.4. This process achieves a reconfiguration in the form of a UMTS to GPRS cell reselection prior to establishment of a dedicated channel. This reconfiguration also goes along with a bandwidth decrease and a reduction in signalling in order to achieve a decrease in average input power on the side of the user equipment.

As a result, the user equipment employs a second set of operating parameters as instructed by the control signal, instead of the previous first set of operating parameters. The second set of operating parameters requires a smaller average power input by the user equipment in using radio resources for the connection to the at least one cellular radio access network in comparison with the first set of operating.

Figure 4:
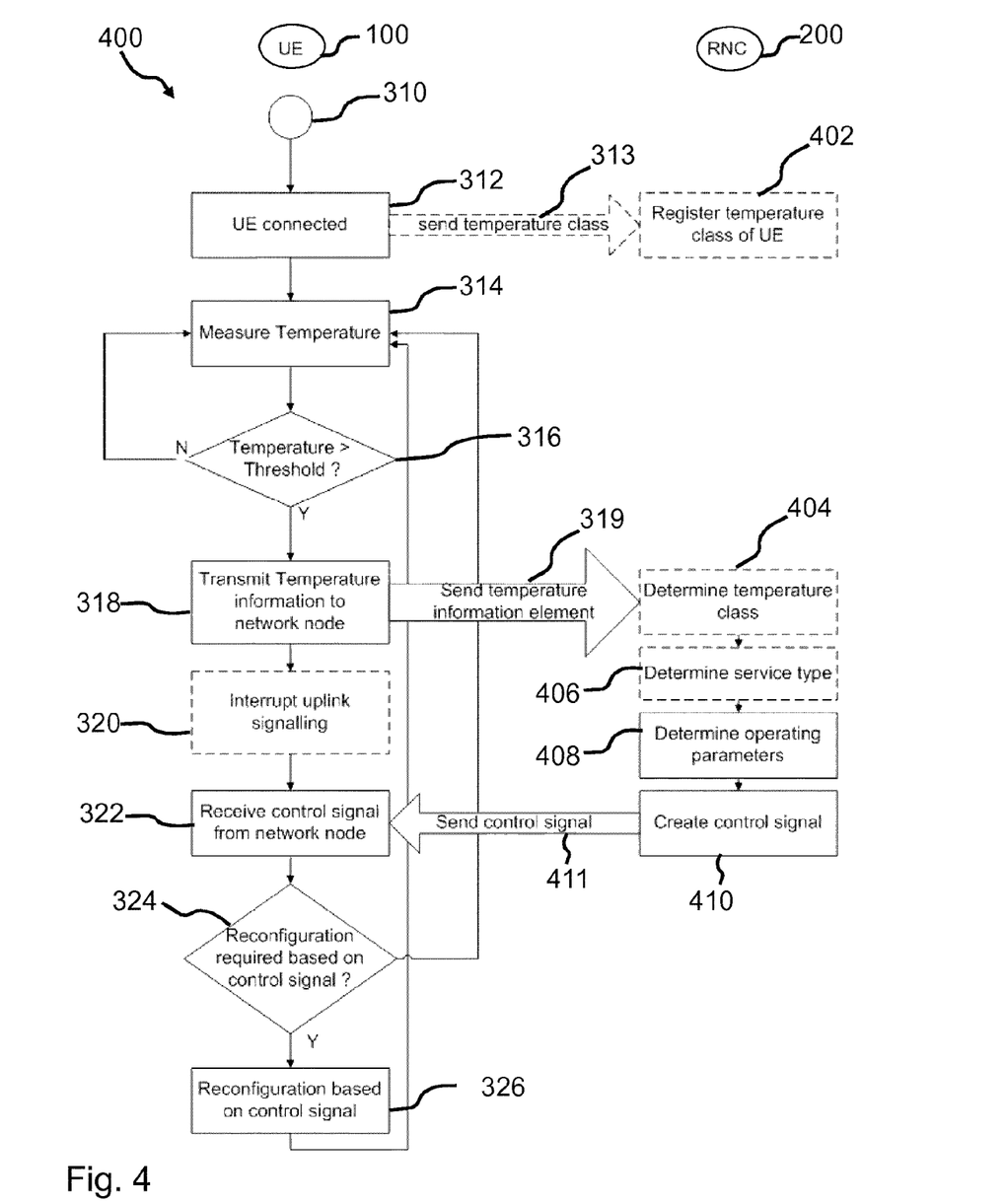
FIG. 4 shows a flow diagram of a signalling exchange between a user equipment and a radio network controller, at the same time showing an embodiment of a method of operating a radio-network-controller node.

FIG. 4 shows a flow diagram of a signalling exchange between a user equipment 100 and a radio-network-controller node 200, at the same time showing an embodiment of a method 400 of operating a radio-network-controller node.

The method steps performed on the side of the user equipment substantially correspond to those of the embodiment of FIG. 3. The same reference labels are used for that reason. Differences to the process of FIG. 3 will be explained in the following. Accordingly, in the context of the step 312, in which the user equipment 100 is connected to a radio access network using a first radio link associated with a first set of operating parameters on the side of the user equipment, the user equipment sends temperature-capability information in the form of a temperature-capability class to the radio-network-controller node 200 in a step 313. In a 3G technology, it is sent via a Node B. In response, the radio network controller 200 registers the temperature-capability information for potential later reference. In one implementation (not shown), the temperature-capability information is sent in the process of initially setting up the connection. In response, the radio-network-controller node 200 determines a first radio link in dependence on the temperature-capability information allocated to the user equipment 100. The initial configuration may for instance follow a process outlined in 3GPP TR 25.931, V11.0.0 (2012-09), page 35, FIG. 14 This process achieves an unsynchronized configuration of a radio access bearer and a download channel. This configuration of the radio access bearer and of the download channel is negotiated between the radio-network-controller 200 acting as a Serving RNC and the core network in RANAP and ALCAP signalling steps. The SRNC determines a suitable first radio link and requests the setup in exchange with the core network. The determination of the first radio link is further optionally based in addition on a requested service type. Accordingly, the average input power on the side of the user equipment is set to a value that is suitable for the given temperature capability of the user equipment. As mentioned, this initial setup in accordance with the temperature capability information is an option.

Returning to the process of FIG. 4, the user equipment may communicate signalling data or payload data via the radio access network according to a requested service and using the first radio link. After the operating temperature of the user equipment is determined in step 314 and, in step 316, it has been determined that the measured operating temperature has exceeded a predetermined upper threshold value, the user equipment sends the temperature information to a radio-network-controller node of the radio access network via the air interface in step 319.

In accordance with step 318 the temperature information element is for instance directed to a radio-network-controller node, such as the node 200 shown in FIG. 2. Optionally, the user equipment interrupts any uplink signalling (step 320) until a control signal is received from the network node in step 322. In step 324, the user equipment determines whether the control signal is indicative of an instruction to the user equipment to reconfigure its connection to the cellular radio access network to use a second set of operating parameters requiring a smaller average power input by the user equipment in using radio resources for the connection to the cellular radio access network in comparison with the first set of operating parameters. If this is not the case, the user equipment branches back to step 314 to determine whether the measured extreme-temperature condition is still present. If, on the other hand, the control signal does instruct the user equipment to reconfigure its connection, this step is performed in accordance with the instructions in step 326.

The radio-network-controller node 200, in response to receiving the temperature information element, determines in step 408 a set of second operating parameters suitable for reducing the average input power on the side of the user equipment 100. In one implementation of this process, the radio-network-controller node performs this step only after determining the temperature-capability element of the user equipment in a step 404, and uses this additional information to additionally custom-tailor the radio link to the temperature capability of the user equipment. In another implementation, the requested service type is additionally or alternatively determined in a step 406 and taken into consideration in the determination performed in step 408. A control signal incorporating the instruction to adapt the configuration of the radio link is generated by the radio-network-controller node 200 in a step 410 and sent to the user equipment in a step 411. The subsequent steps on the side of the user equipment alone and in exchange with the radio access network correspond to those described above in the context of FIG. 3.

Thus, according to the present invention, an operation of the user equipment is achieved that allows handling extreme temperature conditions without requiring a breakdown of an established radio link. As described herein above, the invention does not exclude such breakdown, which may form an escalation in case the measures taken in accordance with the present invention do not lead to a desired decrease of the operating temperature of the user equipment.

The invention claimed is:

1. An operating method of a user equipment that is configured to exchange signals with network nodes of a cellular radio access network, the method comprising
connecting the user equipment to at least one cellular radio access network via at least one first radio link, using a first set of operating parameters that are associated with the at least one first radio link;
before operating under an assignment to the at least one first radio link:
performing, by the user equipment, a measurement of a quantity that is indicative of a current operating temperature of the user equipment or performing a predetermined sequence of at least two such measurements;
determining, by the user equipment, whether or not at least one predetermined upper threshold value of the operating temperature or of an increase of the operating-temperature or of an increase rate of the measured operating temperature has been reached or exceeded;
if the upper threshold value is determined to be reached or exceeded, transmitting, by the user equipment, a first temperature information element to a network node of the cellular radio access network, the temperature information element being indicative of the fact that the respective upper threshold value has been reached or exceeded;
transmitting, by the user equipment, a request signal for an initial allocation of radio resources to trigger an allocation of the at least one first radio link to the user equipment, the request signal including a second temperature information element indicative of a predetermined temperature capability information allocated to the user equipment; and
receiving, by the user equipment, in response to its transmission of the first temperature information element, from a radio-network-controller node a control signal indicative of an instruction to the user equipment to reconfigure its connection to the at least one cellular radio access network to use a second set of operating parameters requiring a smaller average power input by the user equipment in using radio resources for the connection to the at least one cellular radio access network in comparison with the first set of operating parameters; wherein
the received control signal is further indicative of an instruction to operate under an assignment to at least one second radio link, which is different from the first radio link, and
the user equipment, in response to receiving the control signal, performs a radio-link reconfiguration procedure and changes from the at least one first radio link to the at least one second radio link in order to use the second set of operating parameters, said at least one second radio link using a different technology than a technology of the at least one first radio link.

2. The method of claim 1, wherein the received control signal is further indicative of an instruction to reconfigure the first set of operating parameters so as to form a second set of operating parameters when said user equipment is under assignment to the at least one first radio link.

3. The method of claim 1, wherein the control signal is additionally indicative of an instruction to suspend the connection to the at least one radio access network via the first radio link for a determined time span, and to resume the connection after the determined time span has elapsed, and wherein the user equipment, in response to receiving the control signal, suspends the connection to the at least one radio access network via the first radio link for the determined time span, and resumes the connection after the determined time span has elapsed.

4. The method of claim 1, wherein the radio link is a radio access bearer, or a dedicated radio channel, or a shared radio channel.

5. The method of claim 1, wherein the user equipment interrupts using the radio resources allocated to the at least one first radio link for sending payload data in an uplink direction after determining that the measured operating temperature is equal or higher than the upper operating-temperature threshold value, until the control signal has been received.

6. The method of claim 1,
wherein
defining, by the second temperature information element, the temperature capability information allocated to the user equipment by means of an allocation of the user equipment to a respective class of a predetermined classification that specifies in different classes, which are distinguished from each other by at least one of the following: an upper operating-temperature threshold value, a maximum allowable gradient of the operating temperature over a predefined time span, a maximum allowable operating-temperature load over a predefined time span, a maximum allowable level of power output by the user equipment in using radio resources, or one of a set of different allowable maximum time spans for respective given power output levels.

7. A user equipment that is configured to exchange signals with network nodes of a cellular radio access network, the user equipment comprising
a communication unit, which is configured to establish, maintain and use radio resources of a connection to a least one cellular radio access network via at least one first radio link, using a first set of operating parameters that are associated with the at least one first radio link;
a measurement unit which is configured to perform a measurement of a quantity that is indicative of a current operating temperature of the user equipment or to perform a predetermined sequence of at least two such measurements;
an evaluation unit which is connected with the measurement unit and the communication unit and which is configured to determine whether or not at least one predetermined upper threshold value of the operating temperature or of an increase of the operating-temperature or of an increase rate of the measured operating temperature has been reached or exceeded;
wherein the communication unit is further configured
to transmit, if the upper threshold value is determined to be reached or exceeded, a first temperature information element to a network node of the cellular radio access network, the temperature information element being indicative of the fact that the respective upper threshold value has been reached or exceeded;

to transmit a request signal for an initial allocation of radio resources to trigger an allocation of the at least one first radio link to the user equipment, the request signal including a second temperature information element indicative of a predetermined temperature capability information allocated to the user equipment, and to receive, in response to its prior transmission of the first temperature information element, from a radio-network-controller node a control signal indicative of an instruction to the user equipment to reconfigure its connection to the at least one cellular radio access network to use a second set of operating parameters requiring a smaller average power input by the user equipment in using radio resources for the connection to the at least one cellular radio access network in comparison with the first set of operating parameters, to determine that the received control signal is further indicative of an instruction to operate under an assignment to at least one second radio link, which is different from the first radio link, and in response to determining that the received control signal is further indicative of an instruction to operate under an assignment to at least one second radio link, to perform a radio-link reconfiguration procedure and changes from the at least one first radio link to the at least one second radio link in order to use the second set of operating parameters instead of the first set of operating parameters, said at least one second radio link using a different technology than a technology of the at least one first radio link.

8. The user equipment of claim 7, wherein the communication unit is configured to determine that the received control signal is additionally indicative of an instruction to reconfigure the first set of operating parameters so as to form a second set of operating parameters when said user equipment is under assignment to the at least one first radio link.

9. The user equipment of claim 7, wherein the communication unit is configured to determine that the control signal is additionally indicative of an instruction to suspend the connection to the at least one radio access network via the first radio link for a predetermined time span, and to resume the connection after the determined time span has elapsed, and, in response to determining this, to suspend the connection to the at least one radio access network via the first radio link for the determined time span, and to resume the connection after the determined time span has elapsed.

10. The user equipment of claim 7, wherein the communication unit is configured to interrupt, in response to determining that the upper threshold value has been reached or exceeded and until the control signal has been received, using the radio resources allocated to the at least one first radio link for sending payload data in an uplink direction.

11. The user equipment of claim 7, wherein the second temperature information element defines the temperature capability information allocated to the user equipment by means of an allocation of the user equipment to a respective class of a predetermined classification that specifies in different classes, which are distinguished from each other by at least one of the following: an upper operating-temperature threshold value, a maximum allowable gradient of the operating temperature over a predefined time span, a maximum allowable operating-temperature load over a predefined time span, a maximum allowable level of power output by the user equipment in using radio resources, or one of a set of different allowable maximum time spans for respective given power output levels.

12. An operating method of a radio-network-controller node of a cellular radio access network, comprising:

before establishing the radio resources:

serving, by the radio-network-controller node, a user equipment in a connection to the cellular radio access network via at least one first radio link and requiring the user equipment to use a first set of operating parameters that are associated with the at least one first radio link;

receiving, by the radio-network-controller node, a first temperature information element from the user equipment, the first temperature information element being indicative of the fact that at least one predetermined upper threshold value of an operating-temperature or of an increase of the operating-temperature or of an increase rate of the operating temperature of the user equipment has been reached or exceeded;

receiving, by the radio-network-controller node, a request for an initial allocation of radio resources from the user equipment, the request comprising a second temperature information element, the second temperature information element being indicative of a temperature capability information allocated to the user equipment; and in response to receiving the first temperature information element, sending, by the radio-network-controller node, to the user equipment a control signal indicative of an instruction to the user equipment to reconfigure its connection to the at least one cellular radio access network so as to use a second set of operating parameters requiring a smaller average power input by the user equipment in using radio resources for the connection to the at least one cellular radio access network in comparison with the first set of operating parameters, wherein the control signal includes an instruction to the user equipment to operate under an assignment to at least one second radio link, which is different from the first radio link, and wherein the radio-network-controller node, in response to sending the control signal, performs a radio-link reconfiguration procedure and changes from the at least one first radio link to the at least one second radio link in order to require the user equipment to use the second set of operating parameters, said at least one second radio link using a different technology than a technology of the at least one first radio link.

13. The method of claim 12, wherein the control signal comprises an instruction to the user equipment to reconfigure the first set of operating parameters so as to form a second set of operating parameters when said user equipment is under assignment to the at least one first radio link.

14. The method of claim 12, additionally comprising, determining, by the radio-network-controller node, and selecting the first set of operating parameters from a plurality of sets of operating parameters as being suitable for a radio link to be allocated to the user equipment in dependence on the second temperature information element;

performing a predetermined signalling sequence for setting up the determined first radio link and allocating it to the user equipment.

15. The method of claim 14, wherein the request for allocation of radio resources from the user equipment additionally comprises service-type information indicative of a service type requested by the user equipment, and wherein the radio-network-controller node selects the first set of operating parameters in additional dependence on the service-type information.

16. The method of claim 14, wherein the radio-network-controller node, before sending to the user equipment the control signal indicative of the instruction to set up the first radio link or to reconfigure the connection so as to use the second set of operating parameters, selects the first set of operating parameters or the second set of operating parameters in additional dependence on the temperature capability information allocated to the user equipment or on the service-type information received from the user equipment, or on both.

17. A radio-network-controller node of a cellular radio access network, comprising
a resource-control unit configured to establish and maintain radio resources allocated to at least one first radio link allocated to a user equipment; wherein the
the resource-control unit is further configured to
(i) receive a first temperature information element from the user equipment, the first temperature information element being indicative of the fact that at least one predetermined upper threshold value of an operating temperature of the user equipment or of an increase of the operating-temperature or of an increase rate of the operating temperature has been reached or exceeded,
(ii) receive a request for allocation of radio resources from the user equipment, the request comprising a second temperature information element, the second temperature information element being indicative of a temperature capability information allocated to the user equipment; and
(iii) in response to receiving the first temperature information element, to send to the user equipment a control signal indicative of an instruction to the user equipment to reconfigure its connection to the at least one cellular radio access network so as to use a second set of operating parameters requiring a smaller average power input by the user equipment in using radio resources for the connection to the at least one cellular radio access network in comparison with the first set of operating parameters, wherein
the control signal includes an instruction to the user equipment to operate under an assignment to at least one second radio link, which is different from the first radio link, and wherein the radio-network-controller node, in response to sending the control signal, performs a radio-link reconfiguration procedure and changes from the at least one first radio link to the at least one second radio link in order to require the user equipment to use the second set of operating parameters, said at least one second radio link using a different technology than a technology of the at least one first radio link.

18. The radio-network-controller node of claim 17, wherein the resource-control unit is further configured to
determine a set of operating parameters as the first set of operating parameters for being suitable for a radio link to be allocated to the user equipment in dependence on the second temperature information element; and
perform a predetermined signalling sequence for setting up the determined first radio link and allocating it to the user equipment.

\* \* \* \* \*